Figures 1, 2:
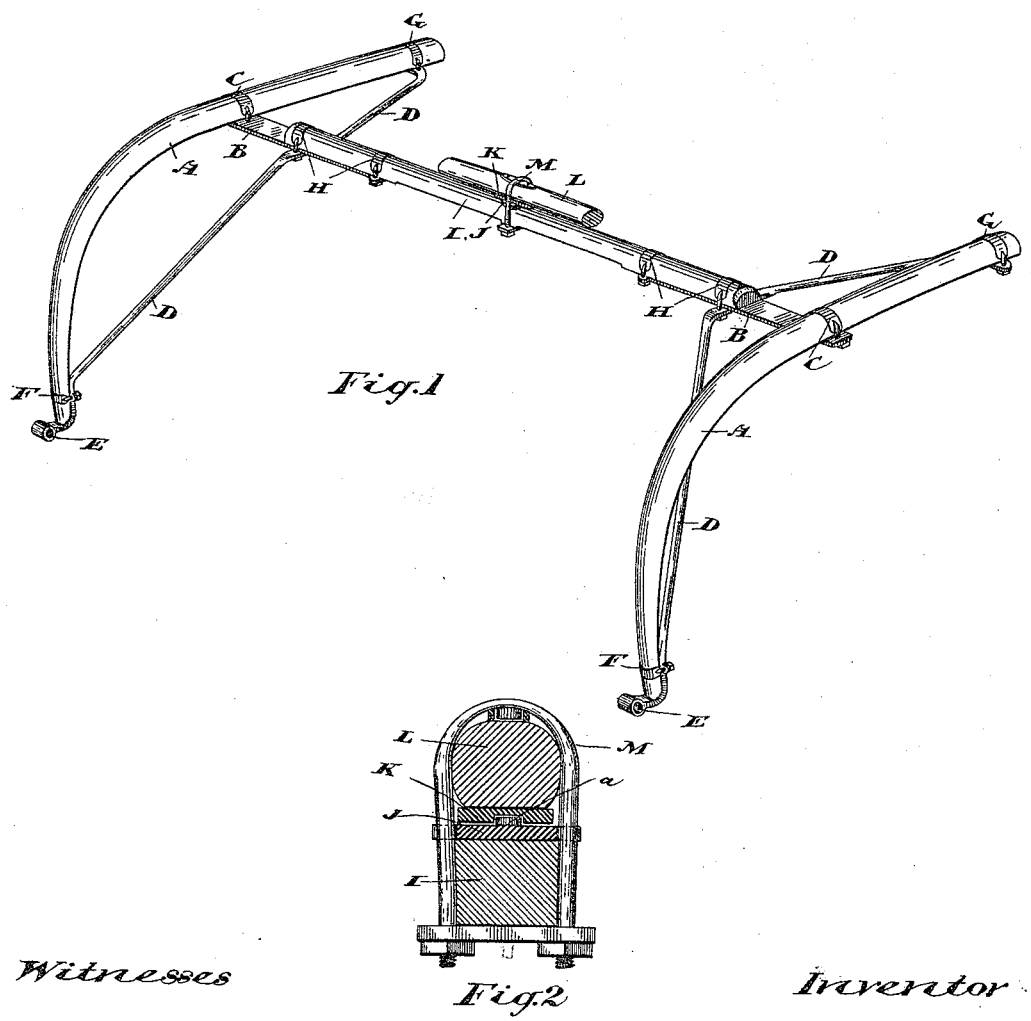

(No Model.)

G. E. BANFIELD.
VEHICLE SHAFTS.

No. 451,014. Patented Apr. 28, 1891.

Witnesses
T. R. Cameron
W. G. McMillan

Inventor
George E. Banfield
by Donald C. Ridout & Co.
Attys.

UNITED STATES PATENT OFFICE.

GEORGE E. BANFIELD, OF TORONTO, CANADA, ASSIGNOR TO ROBERT IRVINE, OF SAME PLACE.

VEHICLE-SHAFT.

SPECIFICATION forming part of Letters Patent No. 451,014, dated April 28, 1891.

Application filed August 26, 1890. Serial No. 363,115. (No model.)

*To all whom it may concern:*

Be it known that I, GEORGE EVERETT BANFIELD, blacksmith, of the city of Toronto, in the county of York, in the Province of Ontario, Canada, have invented a certain new and useful Improvement in Shafts for Vehicles, of which the following is a specification.

The object of the invention is to construct a pair of shafts in such a way that the distance between them may be readily adjusted to suit various sizes of horses or any width of buggy or other vehicle; and it consists, essentially, of a pair of shafts, each shaft made independent of the other, but adjustably connected by means of a cross-bar secured by clips extending from a braced metal arm fastened one to each shaft by a metal clip, the whole being arranged substantially as hereinafter more particularly explained.

Figure 1 is a perspective view of my adjustable shaft. Fig. 2 is a cross-section.

The primary object of my invention is to make the shafts so that they may be readily adjusted to any convenient width; but in constructing the shafts in accordance with my invention I have kept in view the importance of making them very strong, and it will be observed that instead of weakening the shafts at the connecting-points my connections are such as to greatly strengthen the said parts.

The shafts marked A may be made of any desired design, each shaft A having an arm or bar B secured to it by means of a clip C. This arm or bar B is braced by a stay D, one end of which extends to the coupling end of the shaft A, and has a thill-coupling E formed on its end. This stay D is secured to this end of the shaft A by means of a clip F. The other end of the stay D extends diagonally to the shaft A, to which it is secured by means of a clip G.

Each arm or bar B is provided with two clips H, through which the cross-bar I is passed. By loosening the clips H the shafts A may be moved farther from or nearer to each other, so that the said shaft may be readily fitted to any ordinary width of vehicle. It will be merely necessary to tighten the clips H to form a rigid connection between the shafts.

With a view of carrying out my idea to make all connections without weakening any part of the shafts, I screw a plate J on the top of the cross-bar I, and a corresponding plate K on the bottom of the whiffletree L, forming a teat $a$ on one of the plates to fit into a round hole or recess made in the other plate, as indicated in the drawings, so as to form a pivot-point for the whiffletree L. A clip M secures the whiffletree to the cross-bar I, as indicated in the drawings. From this description it will be seen that my invention produces a strong pair of shafts rigidly braced together in such a manner that they may be easily and quickly adjusted to suit the various widths required to fit large or small horses.

What I claim as my invention is—

1. The combination, with a pair of shafts and a cross-bar at substantially right angles to a line drawn centrally between said shafts, of adjustable connections rigidly connected with the shafts and adjustably connected with the cross-bar and moving with said shafts in a line parallel with the cross-bar, substantially as described.

2. The combination, with a pair of shafts and a cross-bar and connections between them, of a pair of stays, each having one end forming a portion of the thill-coupling and both ends rigidly attached to the shaft in front of a cross-bar and connected to said cross-bar by an adjustable clip constructed to move in a line parallel with the cross-bar, substantially as described.

3. A pair of shafts A, each shaft being provided with an arm or bar B, secured to it by a clip, the said arm or bar being braced to the shaft A by a stay D, in combination with a cross-bar I, adjustably connected to the arm or bar B by means of the clips H, substantially as specified.

Toronto, July 11, 1890.

GEORGE E. BANFIELD.

In presence of—
 CHARLES C. BALDWIN,
 FREDERICK A. WOODWARD.